US007650779B2

(12) United States Patent
Puckett et al.

(10) Patent No.: US 7,650,779 B2
(45) **Date of Patent: *Jan. 26, 2010**

(54) METHOD AND APPARATUS FOR DETERMINING CORRECT INSTALLATION FOR GEAR-DRIVEN FUEL PUMP ON A FUEL INJECTED IC ENGINE

(75) Inventors: Daniel Reese Puckett, Peoria, IL (US); Yanli Yang, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 77 days.

This patent is subject to a terminal disclaimer.

(21) Appl. No.: 11/976,164

(22) Filed: Oct. 22, 2007

(65) Prior Publication Data

US 2008/0302175 A1 Dec. 11, 2008

Related U.S. Application Data

(60) Provisional application No. 60/924,917, filed on Jun. 5, 2007.

(51) Int. Cl.
*G01M 15/09* (2006.01)

(52) U.S. Cl. .................................................... 73/114.41

(58) Field of Classification Search .. 73/114.38–114.54
See application file for complete search history.

(56) References Cited

U.S. PATENT DOCUMENTS 4,023,403 A 5/1977 Smith
4,164,922 A 8/1979 Eheim et al.
4,782,692 A 11/1988 Peden et al.
5,020,362 A * 6/1991 Hart et al. ................ 73/114.43
5,441,027 A 8/1995 Buchanon et al.
5,445,019 A * 8/1995 Glidewell et al. ........ 73/114.51
5,492,099 A * 2/1996 Maddock .................... 123/446
5,616,837 A 4/1997 Leonard et al.
5,633,458 A * 5/1997 Pauli et al. ............... 73/114.51
5,708,202 A 1/1998 Augustin et al.
5,715,786 A * 2/1998 Seiberth ................. 123/198 D
5,769,611 A 6/1998 Djordjevic
6,014,958 A 1/2000 Miwa et al.
6,135,090 A 10/2000 Kawachi et al.
6,318,343 B1 11/2001 Nakagawa et al.
6,336,445 B1 1/2002 Yamazaki et al.

(Continued)

*Primary Examiner*—Lisa M Caputo
*Assistant Examiner*—Freddie Kirkland, III
(74) *Attorney, Agent, or Firm*—Finnegan, Henderson, Farabow, Garrett & Dunner; Carl E. Myers

(57) ABSTRACT

Methods and apparatus are disclosed for detecting whether a gear-driven fuel pump has been installed correctly in a fuel injected IC engine, the pump gear being driven by an engine gear to provide fuel to injectors via a fuel rail. The method may include providing a pump element pumping event. The method may also include disabling overlapping fuel injectors and overlapping pumping events during the test period surrounding the selected pumping event, and measuring the pressure in the rail during the pumping event with the overlapping injectors disabled, the at least two different engine crank angles surrounding the pumping event. The method also may further include determining from the measured rail pressures whether the pumping event occurred at a desired engine crank angle. Apparatus to carry out the methods may include a computer programmed for controlling the sequence of the providing, disabling, measuring, and determining functions, as well as software for carrying out the respective functions.

19 Claims, 5 Drawing Sheets

U.S. PATENT DOCUMENTS

| | | | | |
|---|---|---|---|---|
| 6,526,947 | B2 * | 3/2003 | Shimada et al. | 123/495 |
| 6,672,285 | B2 | 1/2004 | Smith et al. | |
| 6,758,656 | B2 | 7/2004 | Maier et al. | |
| 6,953,025 | B2 | 10/2005 | Takahashi | |
| 7,007,676 | B1 * | 3/2006 | Schuricht et al. | 123/479 |
| 7,337,652 | B2 * | 3/2008 | Shamine | 73/40 |
| 7,370,638 | B2 * | 5/2008 | Hayakawa | 123/467 |
| 7,392,792 | B2 * | 7/2008 | Puckett | 123/456 |
| 7,444,993 | B2 * | 11/2008 | Hofmeister | 123/479 |
| 2003/0012664 | A1 | 1/2003 | Maier et al. | |
| 2004/0000288 | A1 * | 1/2004 | Puckett | 123/446 |
| 2007/0079792 | A1 * | 4/2007 | Dingler et al. | 123/198 D |
| 2008/0022973 | A1 * | 1/2008 | Puckett et al. | 123/446 |
| 2008/0041331 | A1 * | 2/2008 | Puckett | 123/198 D |
| 2008/0109152 | A1 * | 5/2008 | Puckett | 701/115 |
| 2008/0302174 | A1 * | 12/2008 | Puckett et al. | 73/114.41 |

* cited by examiner

METHOD AND APPARATUS FOR DETERMINING CORRECT INSTALLATION FOR GEAR-DRIVEN FUEL PUMP ON A FUEL INJECTED IC ENGINE

This application claims benefit to Provisional Application No. 60/924,917 filed Jun. 5, 2007, and is related to Application No. (8350-7325), filed concurrently herewith and entitled “Method and Apparatus for Testing a Gear-Driven Fuel Pump on a Fuel Injected IC Engine.”

TECHNICAL FIELD

The present disclosure relates to service tests for fuel injected internal combustion (IC) engines. Specifically, the present disclosure relates to a diagnostic procedure and apparatus for verifying correct installation of a gear-driven fuel pump for supplying a fuel rail on an injected IC engine.

BACKGROUND

Incorrectly installed gear-driven fuel pumps can result in incorrect pump timing relative to the timing of fuel injectors on fuel injected IC engines. For example, if the pump is installed with the pump gear angularly displaced by even one gear tooth relative to design conditions, the control of the pump is compromised. In particular, incorrect pump timing relative to engine timing (i.e. as measured by engine crank angle) can result in unstable fuel rail pressure, and/or limit the maximum flow rate of the pump. Hence, there is a need for apparatus and methods for confirming and/or gear installation. Furthermore, it would be advantageous to provide apparatus and methods for testing for correct pump gear installation in-situ, that is, with the fuel supply system already mounted to the IC engine, such as part of a new engine check out procedure, or during an engine maintenance program. Methods for testing installed fuel supply systems are known, but not for pump gear installation testing. For example, U.S. Pat. No. 5,708,202 to Augustine et al. discloses a method for testing for unacceptable leakage in fuel injection systems installed in IC engines. The method includes measuring pressure in the common fuel rail at two points in time between a fuel injection event and an immediately prior or subsequent pump delivery event. Any difference in measured pressure such as due to system fuel leakage is compared with a predetermined acceptable threshold leakage value. If the pressure difference exceeds the threshold, an “operating error” is indicated. The method also contemplates switching off momentarily at least one of successive fuel injection events and pump delivery events to extend the time period between pressure measurements, to detect small leakage volumes.

SUMMARY OF THE PRESENT DISCLOSURE

In one aspect of the present disclosure, apparatus is disclosed for detecting whether a gear-driven fuel pump has been installed correctly in a fuel injected IC engine, the pump gear being driven by an engine gear to supply injectors via a fuel rail. The apparatus may include a computer operatively connectable to the engine and programmed with software for providing a pump element pumping event. The apparatus may also include software for disabling overlapping injectors during a test period surrounding the pumping event, and software for measuring the pressure in the rail at least two engine crank angles surrounding the pumping event during the test period with the overlapping injectors disabled. The apparatus also may include software to control operation of the providing software, the disabling software, and the measuring software.

In another aspect of the present disclosure, a method is disclosed for detecting whether a gear-driven fuel pump has been installed correctly in a fuel injected IC engine, the pump gear being driven by an engine gear to supply fuel to injectors via a fuel rail. The method may include providing a pump element pumping event. The method may also include disabling overlapping fuel injectors during a test period surrounding the pumping event and measuring the pressure in the rail at least two different engine crank angles surrounding the pumping event during the test period with the overlapping injectors disabled. The method may further include determining from the measured rail pressures whether the pumping event occurred at a desired engine crank angle.

DETAILED DESCRIPTION

In one aspect of the present disclosure, as broadly disclosed and claimed herein, an apparatus is disclosed for detecting whether a gear-driven fuel pump has been installed correctly in a fuel injected IC engine, the pump supplying fuel to injectors via a fuel rail.

Figure 1:
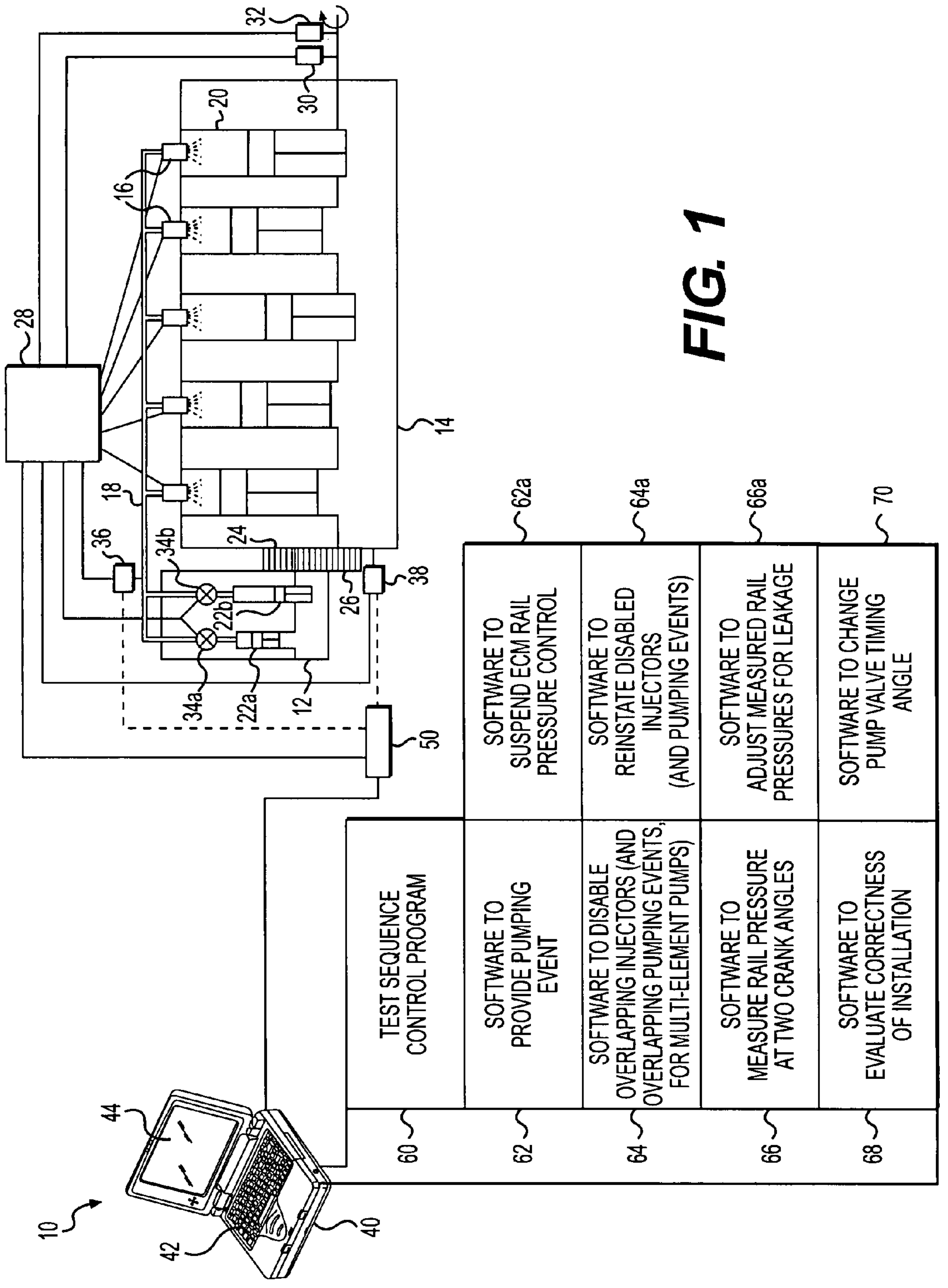
FIG. 1 is a schematic showing apparatus for testing for correct pump gear installation on an injected IC engine, in accordance with one aspect of the present disclosure.

As embodied herein, and with initial reference to FIG. 1, apparatus generally designated by the numeral 10 is shown for detecting whether gear driven pump 12 is installed correctly on IC engine 14. Engine 14, which may be a diesel engine as depicted, is fuel injected via injectors 16 each supplied from a fuel rail 18, as is commonly known. In the FIG. 1 embodiment, engine 14 has a total of five cylinders 20 arranged in an in-line configuration. In the FIG. 1 embodiment, pump 12 may include two piston-type pump elements 22*a*, and 22*b*, for supplying fuel from a fuel source (not shown) to fuel rail 18. Both pump elements 22*a*, 22*b* are interconnected to be driven and timed by a common pump gear 24. Pump gear 24, in turn, is driven by a gear, such as engine gear 26, connected to the engine power train.

As one skilled in the art would understand, in addition to providing power to pump 12 from engine 14, the geared connection between engine gear 26 and pump gear 24 provides coordination between the timing (crank angle) positions of the pistons in cylinders 20 and the power strokes of the individual pump elements 22*a*, 22*b*. Also, as depicted in FIG. 1, engine 14 may include electronic control module (ECM) 28 that may conventionally control operation of the injectors 16 based on piston position in the respective cylinders 20, engine speed (RPM), and/or load as determined from the input of various sensors, such as speed sensor 30 and torque sensor 32. ECM 28 may also control the fuel flow output to rail 18 from each of pump elements 22*a*, 22*b* via solenoid valves 34*a*, 34*b*. Valves 34*a*, 34*b* may be variable opening timing angle valves where valve operation can be controlled by current supplied at times corresponding to different engine crank angles depending upon other engine variables such as engine speed. Appropriate start of current ("SOC") angle values of the pump valve timing maybe stored in ECM 28 as a "map" with the engine variables being the coordinates, as one skilled in the art would understand. In some embodiments the ECM, such as ECM 28 in FIG. 1, may also control fuel rail pressure in fuel rail 18 during operation, based on inputs from rail pressure sensor 36.

It should be understood that the apparatus and methods of the present disclosure are not limited to use with an IC engine of the type shown in FIG. 1, which embodiment is for the purpose of explaining the present disclosure. Rather, the apparatus and methods of the present disclosure may be used with engines with a single fuel pump element, as well as engines with more than two pump elements. Also, the apparatus and methods of the present disclosure may be used with engines having a greater or lesser number of fuel injected piston/cylinders arranged in any one of a number of other conventional configurations (V-shape, flat-opposed, etc.), and engines using injected gasoline or other liquefied fuel.

With continued reference to FIG. 1, apparatus 10 includes a computer 40 that may be programmed to receive and process information regarding engine operating parameters such as engine speed (RPM), engine coolant temperature, fuel rail pressure, engine timing (crank angle), vehicle speed, and vehicle load. As will be discussed henceforth, the computer 40 also includes programmed software 60 for control of certain elements of apparatus 10 including software used to carryout some or all of the elements of the methods of the present disclosure (to be discussed subsequently) during the course of the testing sequence.

As depicted in FIG. 1, computer 40 is a general purpose digital computer that can be suitably programmed to receive and process engine parametric information as well as control the testing in accordance with the methods of the present disclosure. Alternatively, computer 40 may be a special purpose computer such as a microcontroller with firmware for providing some or all of the testing functions. Computer 40 may be a lap-top computer and include a conventional keyboard 42 for enabling operator input such as starting, stopping, pausing, restarting, etc., of the testing sequence. Other input means may be used, such as touch-screen, mouse-activated, etc. Computer 40 may also include a screen, such as screen 44, for displaying information, including the received engine operating parameter information as well as the processed information (status of testing, test results, etc.).

In the FIG. 1 embodiment, computer 40 is operatively interconnected to ECM 28 of engine 14 via service tool 50. Service tool 50 may receive certain engine performance information indirectly such as through ECM 28, such as one or more of engine speed (RPM), load (torque), and engine timing (crank angle), which information may already be in digital form. In some embodiments, service tool 50 may also be interconnected to receive inputs directly from certain sensors on engine 14, such as engine coolant temperature sensor 38, and fuel rail pressure input sensor 36, such as if the information is not available through ECM 28. Service tool 50 may in such applications include appropriate signal conditional equipment e.g. A/C converters for analog signals, as necessary.

Figure 2:
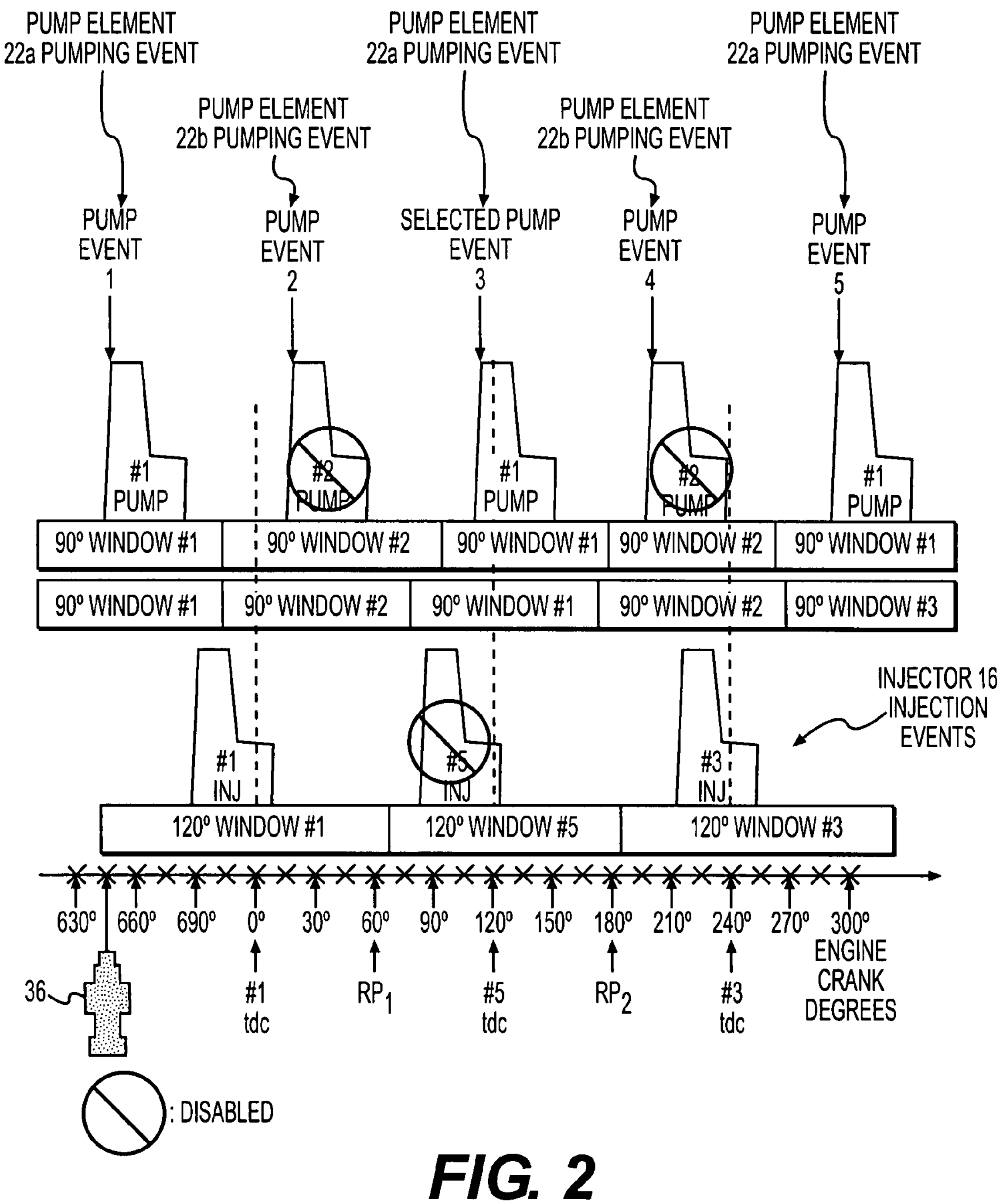
FIG. 2 is a schematic showing testing one pump element pumping event, using the apparatus of FIG. 1.

In accordance with the first aspect of the present disclosure, the testing apparatus includes the computer having software for providing at least one pump element pumping event of the installed pump. As embodied herein and with continued reference to FIG. 1, computer 40 may include programmed software 62 to provide pumping events to operate engine 14 during the testing sequence with gear 24 of pump 12 having been installed previously such as during initial engine manufacture, or during service/replacement of pump 12 installed with pump gear 24 meshed with engine gear 26. In operation, pump 12 would provide a series of pumping events for pump element 22*a* at various engine crank angle intervals during operation of engine 14. For the FIG. 1 embodiment, having a second pumping element 22*b*, the pumping events of pump element 22*a* would alternate with pumping events of pump element 22*b*, as shown in FIG. 2, which depicts an exemplary pumping sequence for the FIG. 1 embodiment.

The programmed software 62 in computer 40 may function to override certain functions of the engine control program in engine ECM 28 to allow testing, or it may be an entirely separate program for controlling engine 14 during testing. In either case, engine control by computer 40 may be achieved through interconnection with ECM 28, which may occur through service tool 50. Such control may include causing pump 12 and engine 14 to first operate normally for a period of time sufficient to establish steady state conditions (e.g. one or more of predetermined speed (RPM), engine coolant temperature, engine load (torque), etc.). In some embodiments, the engine ECM may be configured to provide fuel rail pressure control, as mentioned previously. In such embodiments, software 62 may specifically include suitable software 62*a* for suspending ECM 28 control of the fuel rail pressure during the test period.

Still further in accordance with the first aspect of the present disclosure, the apparatus further includes the computer 40 having software 46 for disabling any "overlapping" injectors during the period when the selected pumping event is to be tested, that is, injectors that would otherwise operate to dispense fuel from the rail to the respective cylinder during the test period. Depending upon the particular application it may be possible to select a testing period where no injectors "overlap," such that none would need be disabled by the apparatus (or method) of the present disclosure.

In the exemplary embodiment of FIG. 1, the disabling software 64 programmed in computer 40 causes ECM 28 to suspend fuel injector 16 injection events during the test period. That is, if the rise in fuel rail pressure due to a selected pumping event of pump element 22*a* were to be measured during a period of time surrounding the pump event (test period), the occurrence of other events influencing pressure in the fuel rail during that time period preferably should be eliminated, or at least their effects minimized, to better isolate the effect of the operation of the pump element being tested. Hence, operation of one or more fuel injectors 16 that would normally operate during the test period are disabled, as they would otherwise cause a drop in fuel rail 18 pressure due to fuel outflow.

In the FIG. 1 embodiment of the present disclosure, disabling "overlapping" injectors 16, for example, injector #5 in the FIG. 2 depiction of engine and pump timing events in an exemplary test sequence, is accomplished by software 64 in computer 40 that overrides the engine control program in ECM 28 to suspend operation of injector #5 during the test period. The test period shown in the FIG. 2 example includes an approximately 180° crank interval, that is from engine crank angle of about 30° (0° corresponds to TDC of engine #1 piston) to a crank angle of about 210°. Of course, a longer or shorter test period could be used as best fits the particular application, as one skilled in the art would appreciate.

Also, for multi-pump element pumps, such as pump 12 in FIG. 1 embodiment, "overlapping" pumping events due to pump elements not being tested may also be disabled by software 64 during the test period, as they would affect fuel rail pressure and "mask" the pressure rise due to the pump element being tested, in the exemplary case, element 22*a*. As discussed previously in relation to overlapping injectors, it may be possible for specific applications to set a testing period during which no pumping events need be disabled during testing, in accordance with the apparatus and methods of the present disclosure. In the FIG. 1 embodiment, pumping events #2 and #4 from pump element 22*b* surrounding pumping event #3 of pump element 22*a* to be tested, are disabled e.g. by overriding the ECM 28 control of solenoid valve 34*b*.

One skilled in the art would appreciate that other means for disabling (overlapping) injectors and/or pumping events could be used. For example, switches installed at the overlapping injectors 16 and at the other pump element solenoid valve 22, under the control of computer 40 through service tool 50, could be used to interrupt power to the overlapping injector and pump element solenoid valve.

In the disclosed embodiment, after the operator selects the pump event to be measured and the engine has achieved a steady state condition (RPM, load, engine coolant temperature, etc.), then during a specific test period when fuel rail pressure measurements are to be taken, the test control program 60 in computer 40 controls software 64 to disable overlapping ones of injectors 16, and pumping events of the other pump element such as pump element 22*b* in the FIG. 2 example for the test period. This momentary change in the normal engine operation may have only a small but tolerable effect on overall engine operation while essentially isolating the effect of the pump element, such as element 22*a*, on the fuel rail pressure, to allow fuel rail pressure measurements to be taken during the test period. Software 64 also may be configured to reinstate the overridden injector operation and pump element cutouts immediately after the test period, such as with software portion 64*a*. Reinstating these operations would allow engine 14 to return to steady state operation, in the event a test is to be rerun one or more times, e.g. to verify accuracy of the measurements.

Further, in accordance with the first aspect of the present disclosure, the test apparatus includes the computer having software for measuring the pressure in the fuel rail at least two engine crank angles surrounding the pumping event during the selected pumping event with the overlapping injectors disabled. As embodied herein, and with continued reference to FIG. 1, software 66 processes (samples) fuel rail pressure sensor 36 signals, such as received indirectly via ECM 28 or received directly and digitized by service tool 50, at preselected times (engine crank angles) during the test period. For example, and as depicted in FIG. 2, fuel rail pressure in rail 18 may be sampled at two positions surrounding the expected crank angle time of pumping event #3 of pump element 22*a*. The two sampling crank angles should be selected as close as possible to the pumping event, given the available sensing pressure and signal processing apparatus, to resolve the angular position of the pumping event based on sensing the rail pressure rise or inflection due to onset of pumping. Or, rail pressure measurement maybe taken at more than two crank angle sampling positions to help determine the inflection point. Also, depending upon the type of fuel rail pressure sensor/transducer 36 normally provided with engine 14, a fast-acting pressure transducer may be substituted for rail pressure sensor 36 or separately added as part of the pressure measuring means of test apparatus 10, to improve resolution of the pressure measurements.

As previously discussed, and as embodied herein, computer 14 includes software 60 for controlling the overall testing sequence for fuel pump 12 and engine 14. Test control program 60 may include controlling the sequential operation of the providing software 62, the disabling software 64, the measuring software 66, etc., and associated hardware discussed previously.

Figure 3A:
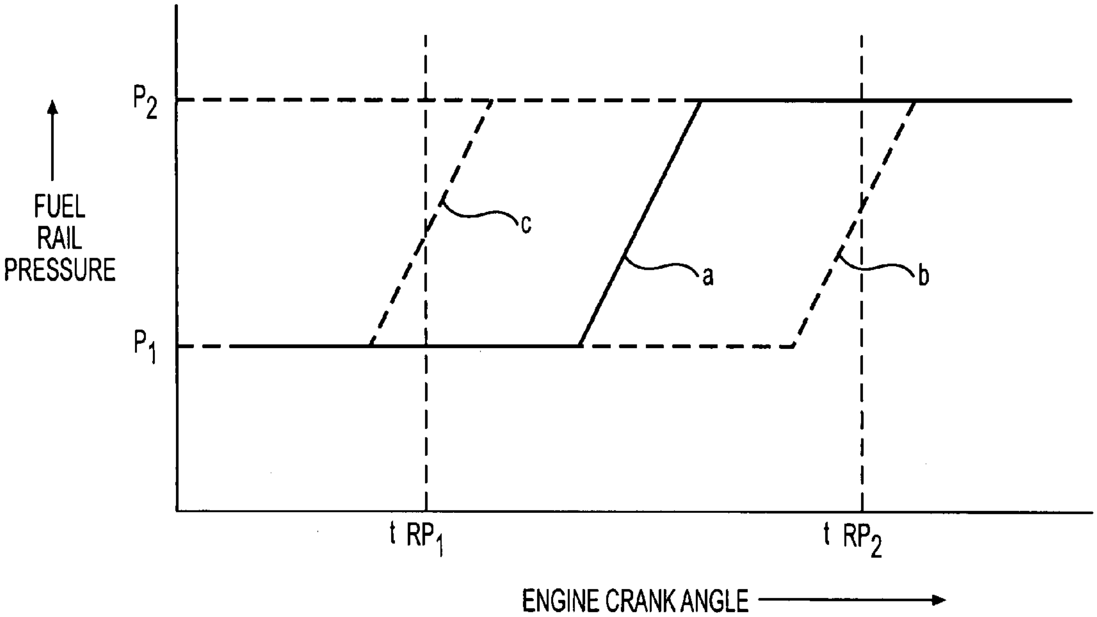
FIGS. 3A and 3B are schematics showing results of testing as in FIG. 2, for correct and incorrect pump gear installation.

The computer may also include software for determining from the measured fuel rail pressures (or averaged measurements, if multiple test runs are conducted) whether the pumping event occurred at a desired engine crank angle indicative of a correct installation. This determination may be accomplished by comparison of the measured rail pressures with predetermined rail pressure values indicative of pump element performance in a correct installation. For example, FIG. 3A is a schematic of fuel rail pressure profile versus engine crank angle for a correctly installed pump (curve a) and incorrectly installed pump (curves b and c), and with first and second pressure measurements, $RP_1$ and $RP_2$, taken at times $Trp_1$ and $Trp_2$. If the earlier of the two pressure measurement equals or is less than a first predetermined value $P_1$ and the later of the two measurements is equal to or greater than a second predetermined value $P_2$, the pump installation may be deemed satisfactory, as in curve a.

If the measured pressure rise does not meet the predetermined value, and the pump includes multiple pumping elements, the test control program in computer 40 may provide the testing sequence to be repeated at another pump gear timing angle. That is, engine 14 would be shut down and pump 12 would be reinstalled in engine 14 with pump gear 24 angularly displaced relative to the engine timing gear 26 such as by one gear tooth in a clockwise or counterclockwise direction. In general, a significant difference in the measured fuel rail pressures should be expected for pump element operation at the correct timing angle versus measured pressures at a displaced (incorrect) timing angle.

As discussed above, limitations in rail pressure sensor and/or signal processing equipment (e.g. AD converters) may cause difficulties in achieving the desired resolution of the onset of the pumping event. Another aspect of the present disclosure, discussed below, may allow the angular distance between the two sampling positions (and thus the elapsed time between samples) to be increased while achieving satisfactory resolution of the pumping event timing. Specifically, for engines equipped with electrically controlled variable opening timing angle pump valves such as 34*a*, 34*b*, the two rail pressure measurements maybe taken at a nominal pump timing angle setting, which would typically correspond to a crank angle providing maximum flow to the rail for a correctly installed pump gear, and at least one additional pump timing angle earlier in time, which would correspond to a crank angle immediately prior to the inflection point for a correctly installed pump gear. That is, software 62 would provide a first pumping event at the first (nominal) pump valve timing angle setting with the overlapping injectors and other pumping events disabled by software 64, and a first set of rail pressure measurement $RP_1$ and $RP_2$ would be taken at the two preselected sampling crank angles. Then, the pump valve timing angle setting would be changed, such as by software 70 operating on the stored SOC values in ECM 28, and the software 62 would cause the pumping event to be repeated (with overlapping injectors and pumping events again disabled), and a second set of rail pressure measurements taken. In the exemplary testing sequence shown in FIG. 2, sampling crank angles of 60° and 180° are used to surround pump event #3 using this procedure.

Figure 3B:
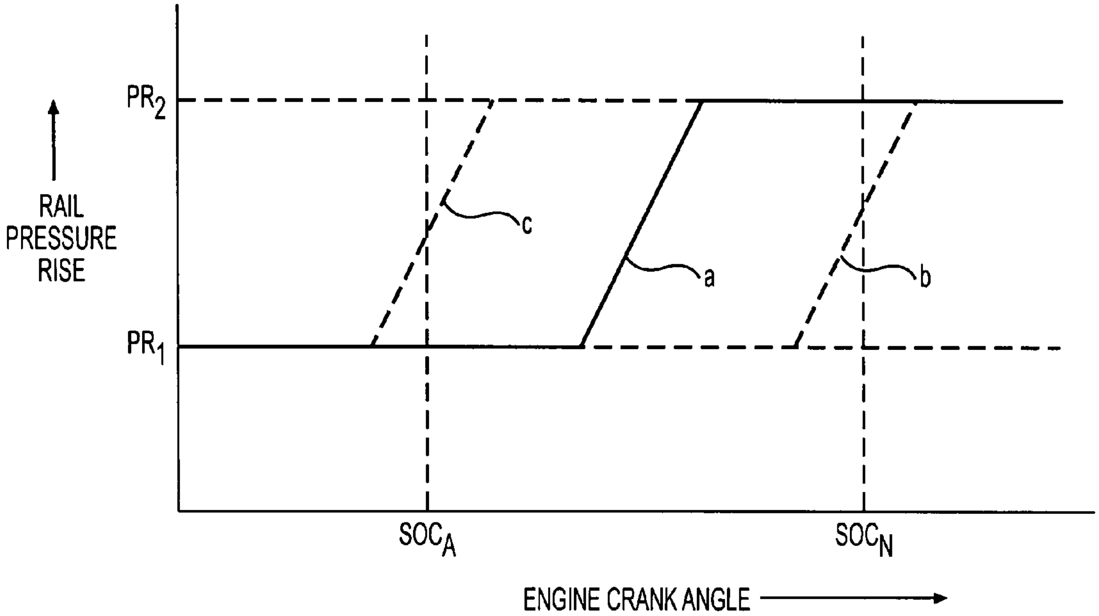

In order to determine whether the pump gear is installed correctly, software 68 can be configured to use each set of two rail pressure measurements $RP_1$ and $RP_2$ to calculate respective rail pressure rise values (e.g. $RPR_1(=RP_2-RP_1)_1$ and $RPR_2(=RP_2-RP_1)_2$). The results may then be compared to respective predetermined rise values ($PR_2$, $PR_1$) for the nominal pump valve timing angle setting $SOC_N$ and the advanced (earlier) pump valve timing angle setting $SOC_A$. FIG. 3B is a schematic similar to FIG. 3 A but depicting rail pressure rise (RPR) versus the engine crank angle corresponding to start of current (SOC) to the solenoids of the pump valves (34*a* or 34*b*) for the selected pumping element. As in FIG. 3A, curve (a) of FIG. 3B represents a correctly installed pump gear while curves (b) and (c) represent an incorrectly installed pump gear. The determination of a correctly installed pump gear (curve (a)) may be made using predetermined values of RPR, namely $PR_1$ and $PR_2$, and requiring the earlier in time (advanced) rail pressure rise to be less than or equal to $PR_1$ and the later in time (nominal) rail pressure rise to be greater than or equal to $PR_2$.

Moreover, using this aspect of the present disclosure may allow the effects of an incorrectly installed pump gear to be mitigated by providing an angular offset to be applied to the stored SOC values in the engine ECM. Specifically, further testing with different pump crank timing angles (+ or − changes) can be carried until the relationship of curve (a) of FIG. 3B is obtained. The angular deviation from the nominal timing angle may be used as the offset value. The offset may be used to "trim" the operation of the pump valves to accommodate the misalignment of the pump gear, and thus may save time and cost for disassembly and re-installation of the pump.

Another possible event during the test period that may affect the accuracy of the rail pressure measurements is fuel rail system leakage. As such, in embodiments of the present disclosure, including apparatus 10 of FIG. 1, the measuring software 66 may also include software 66*a*, for adjusting the measured rail pressures to account for the leakage. The adjusted rail pressure measurements could then be used in place of the unadjusted rail pressure measurements by the software 68 carrying out the evaluation function, namely, determining whether the pumping event occurred at a desired engine crank angle. Various algorithms known to the skilled practitioner could be adopted to convert leakage rates to corresponding pressure drop versus elapsed time for a particular fuel rail system (volume), including algorithms that utilize fuel bulk modulus and engine coolant temperature to convert leakage rates (volumetric or mass flow) to pressure drop versus time. The pressure drops would then be used to adjust the actual measured rail pressures. Alternatively, if available, pressure drop versus time relationships may be used directly to adjust measured rail pressures. Leakage flow rates and/or leakage pressure drop versus time data may be available for a specific fuel rail system, and stored in memory of computer 10, or may be determined from appropriate testing such as using apparatus and methods disclosed in concurrently filed Application No. (8350-7325), entitled "Method and Apparatus for Testing a Gear-Driven Fuel Pump on a Fuel Injected IC Engine," the disclosure of which is hereby incorporated by reference.

Figure 4:
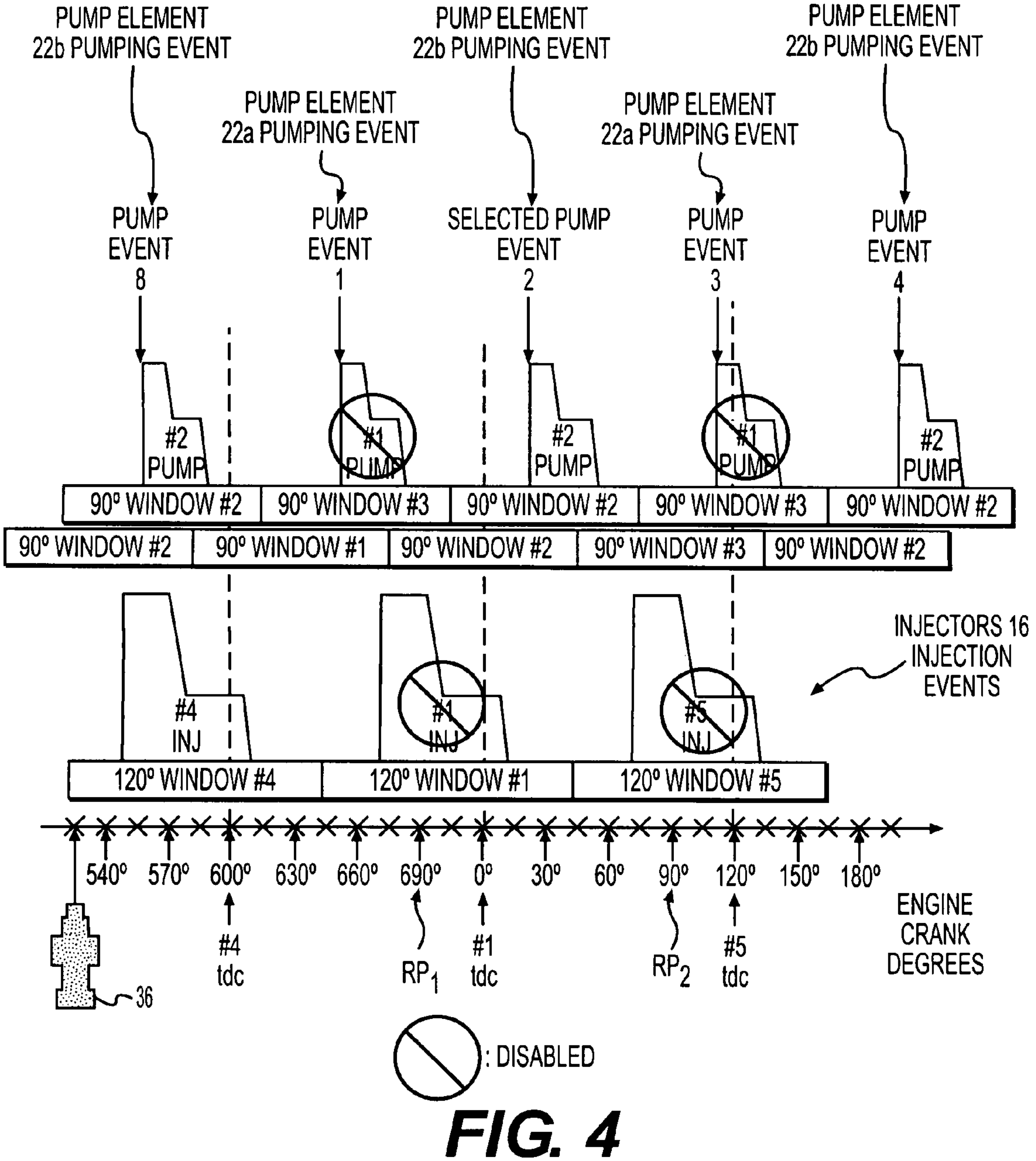
FIG. 4 is a schematic showing testing of a pumping event from another pump element in the IC engine depicted in FIG. 1.

For engines with a multiple pump element pump, apparatus in accordance with the present disclosure may include software for repeating the test sequence using one or more of the other pump elements before concluding that the pump gear has been installed incorrectly, necessitating possibly re-installation. For example, in the embodiment depicted in FIG. 1, both pump elements 22*a* and 22*b* are timed through the same pump gear, namely pump gear 24. Hence, if test sequence control program 60 in computer 40 is configured to conduct further testing using the second pump element (22*b* in this example), the possibility that unacceptable measured fuel rail pressures was due to a faulty or degraded pump element 22*a*, rather than incorrect installation of the timing gear 24, may be eliminated. The depiction of an exemplary test using pump element 22*b* in FIG. 4 shows the selection of an appropriate pumping event and rail pressure sampling times (relative to engine crank angle), allowing identification of overlapping injectors and overlapping pump element 22*a* pumping events. As shown in FIG. 4, pumping event #2 at nominal 30° crank angle #1 was selected, and injectors #1 and #5, and pumping events #1 and #3 due to pump element 22*a*, were identified as "overlapping" by the program executing the test sequence in FIG. 4, using engine timing information typically available.

Still further in accordance with the above-described aspects of the present disclosure, test control program 60 may also include test enable software to confirm that the operating conditions of the engine, such as engine 14 in the FIG. 1 embodiment, are satisfactory, to allow testing sequence to commence. The enable software may include software for determining whether ECM rail pressure control override has been established, in addition to software confirming acceptable engine and vehicle operating conditions, if applicable. Other test enable programs, would occur to the skilled artisan.

One skilled in the art also would recognize that depending upon the sophistication of the engine ECM, a separate service tool, such as service tool 50 in the FIG. 1 embodiment, may not be required. For example, if engine ECM already receives as inputs, and processes digitally, engine coolant temperature and fuel rail pressure signals, then computer 40 may be connectable directly to the ECM for access to the engine coolant temperature and fuel rail pressure signals. Moreover, one skilled in the art would appreciate that some or all of the pump installation testing software programmed in computer 40 could be incorporated/stored in the engine ECM itself during manufacture, to be loaded and/or run by the ECM microcontroller upon suitable prompts. In such a case, an external computer, such as computer 40, may serve only for operator communication (e.g. prompts, testing status, results display, etc.), which could be provided by a lower capacity/cost device. In some embodiments, an engine ECM microcontroller may automatically execute pump element tests at predetermined times during normal steady state engine operation, such as during an idle or cranking (starting) condition, if engine performance was not degraded or made unsafe. The results could be displayed using conventional vehicle warning or text message devices, or merely stored to be accessed during normal engine service.

INDUSTRIAL APPLICABILITY

For reasons stated previously, correct installation of a gear-driven fuel pump may be necessary to achieve the design performance of a fuel rail supply system for an IC engine. The test apparatus discussed above and the methods to be described hereinafter of the present disclosure allow for in-situ testing and may provide significant savings in time and cost not only in the original assembly of an engine, such as engine 14 of the FIG. 1 embodiment, but also in subsequent service/maintenance applications where the gear-driven fuel pump, such as pump 12, is removed for repair and/or is replaced.

In general, the apparatus and methods of the present disclosure are applicable to all types of fuel injected IC engines e.g. diesel, gas, and natural-gas fueled, using a fuel rail supply system fed by a gear-driven fuel pump. Some aspects of apparatus and methods also applicable to fuel rail supply systems having a gear-driven pump with multiple pumping elements, as will be discussed below.

Figure 5:
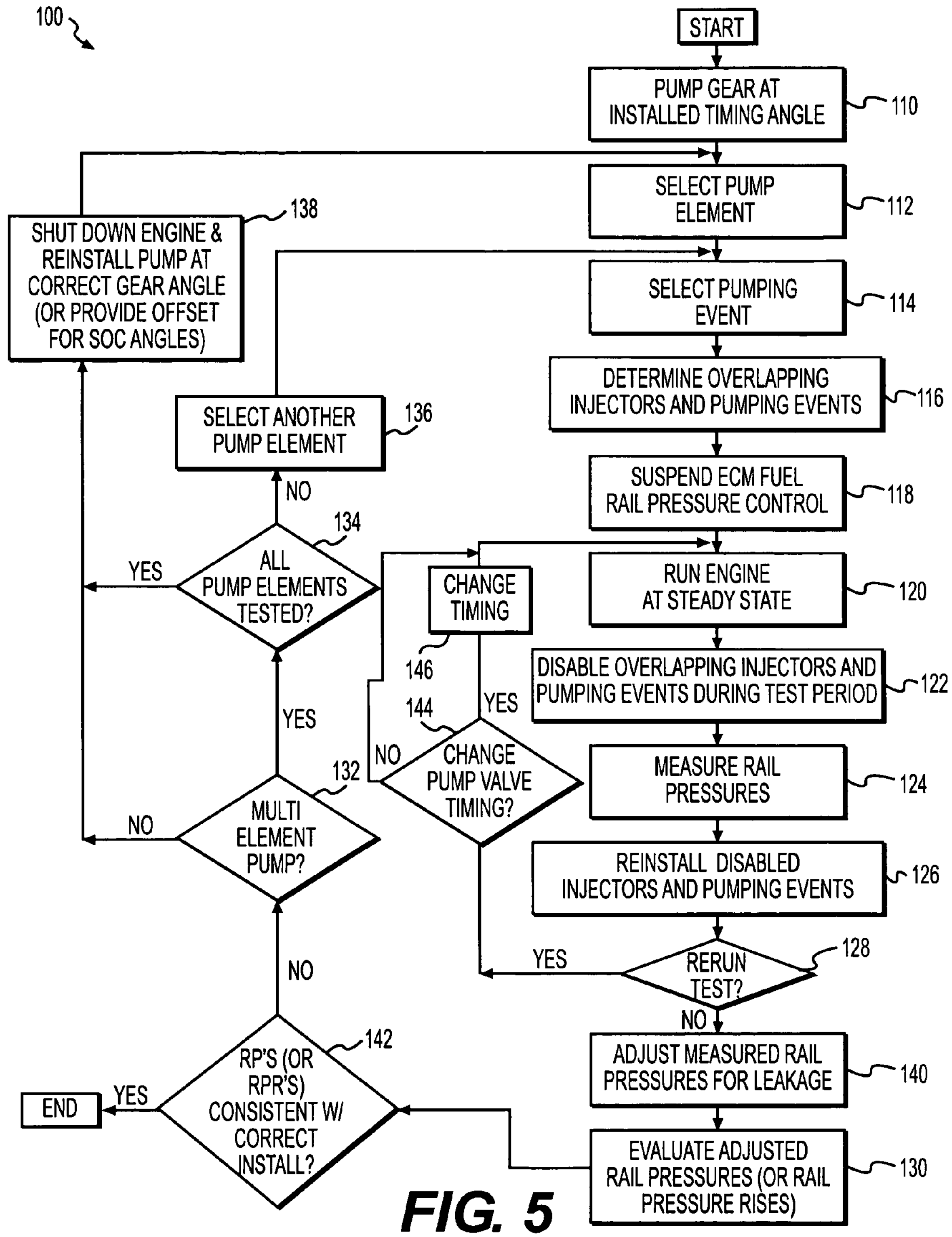
FIG. 5 is a flowchart depicting methods for testing pump gear installation, in accordance with another aspect of the present disclosure.

With initial attention to FIG. 5, which depicts in flow-chart form an exemplary method 100 for detecting whether a gear-driven fuel pump has been installed correctly in a fuel injected IC engine, the gear driven pump is first installed (or has previously been installed) with the pump gear set at preselected pump timing angle relative to engine timing (crank angle). See block 110 in FIG. 5. Typically, during installation, the pump gear will be meshed with a gear driven by the engine drive train in an attempt to effect a design relationship between the pump timing and the engine timing. For instance, in the FIG. 1 embodiment, meshing pump gear 24 with the engine gear 26 may seek to have a pump element (piston) at 89° BTDC relative to the 0° crank angle TDC position of engine piston #1. Other relationships are possible, of course, depending upon how engine timing is determined and the particular construction of the gear driven pump.

Next, at block 112, a pump element is selected for testing, if the fuel rail supply system includes a pump with a multiple pumped elements. For example, in the embodiment depicted in FIG. 1, for the exemplary tests depicted in FIGS. 2 and 4 pump element 22*a* or element 22*b* could be chosen, as a matter of convenience. For the remainder of this discussion, it is assumed that pump element 22*a* is chosen for the first test.

Further, at block 114, a particular pumping event due to the chosen pump element is selected for testing. In general, the fuel pump will provide multiple, sequentially timed pumping events during the complete cycle (720°) of a four-stroke engine. For example, in an exemplary test of the FIG. 1 embodiment such as depicted in FIG. 2, pump event #3 of pump element 22*a* could be chosen. Other pumping events of the pump element 22*a* could, of course, be chosen for convenience.

Thereafter, in block 116, the testing method determines “overlapping” injectors. The method also may identify “overlapping” pumping events due to the other pump elements of a multi-element pump. As discussed previously, “overlapping” injectors (and pumping events, if applicable) can affect measured fuel rail pressure during testing and obscure or reduce the accuracy of fuel rail pressure measurements of the designated pumping event. In carrying out the method element of block 116, the test operator can use the known engine timing relationship of the various injectors and the design pumping events in conjunction with a desired test period surrounding the selected pumping event during which other effects on fuel rail pressure are to be minimized. As shown in the test example in FIG. 2, both pump events #2 and #4 due to the pump element 22*b* were disabled in the test period surrounding the pump event selected (pump event #3 of pump element 22*a*) while only the #5 injector was disabled.

One skilled in the art would also realize that the relationship between engine timing and the operation of the injectors can change with the value of other engine operating parameters, such as engine speed (RPM) and load (torque×RPM). It may be preferred to account for these parameters when identifying such overlapping events by the use of an engine-operating map typically available and usually stored in an engine ECM.

Next, prior to running the engine to accomplish the testing, and in the event that a particular engine ECM includes a fuel rail pressure control function, this control may be suspended, as is depicted in block 118. For example, the engine ECM may adjust engine speed and/or fuel pump delivery to maintain a preselected rail pressure, actions that could otherwise disrupt the testing or render the result inaccurate if allowed to occur during testing. For engines without ECM fuel rail pressure control, block 118 method element may be omitted.

Further, as depicted at block 120, the engine is run normally (without overlapping injectors and/or pumping events disabled) until steady state test conditions are reached. These conditions may be one or more of a specified engine speed (RPM), engine coolant temperature, load, etc.

Further in regard to the method depicted in FIG. 5, during the steady-state operation of the engine, the overlapping injectors and pumping events are momentarily disabled. See block 122. The test period during which they are disabled should surround the pumping event selected in block 112, that is, include crank angles before and after the nominal or design pumping event timing. The test period should be commensurate with the determination in block 116 of “overlapping” injectors and pumping events. Also, as discussed previously in regard to the apparatus shown in FIG. 1, disabling may be done electronically such as by overriding that portion of the ECM engine control program that controls injector operation and fuel pump element output solenoid operation. Or, alternatively, the electronic control could be provided by a completely independent engine test control program in computer 40.

Concurrently with disabling overlapping injectors and pumping events, the method shown in FIG. 5 includes measuring fuel rail pressure due to the selected pumping event at least two crank angles surrounding the pumping event. See block 124. This feature requires that the fuel rail pressure measurements be taken during the period when the overlapping injectors and pumping events are disabled but where the selected pumping event (block 114) of the respective pump element occurs. As discussed previously, the timing of the measurements can be electronically coordinated with the disabling operation. For example, in the FIG. 2 testing example, two fuel rail pressure measurements or “samples” $RP_1$ and $RP_2$ could be taken during the period injector #5 and pumping events #2 and #4 of pump element 22*b* are disabled.

Once the fuel rail pressure measurements are made, the method depicted in FIG. 5 may reinstate the disabled injectors and pumping events and return to a steady state condition (block 126) to prevent damage to the engine and/or allow for subsequent tests. The test sequence also could repeat the operations of blocks 120 to 124 one or more times to provide additional fuel rail pressure measurements surrounding the selected pumping event before the engine is shut down, as is represented in the FIG. 5 flow chart by logic block 128. The fuel rail pressure measurements could then be averaged to provide more accurate indication on the pump element performance at the preset (first) pump timing angle. Also, the operation of blocks 120-124 can be repeated at least once to implement testing with the pump valve timing angle setting varied, as discussed previously. Decision block 144 and operation block 146 depicted in FIG. 5 reflect use of this testing method.

As discussed previously in relation to exemplary apparatus of the present disclosure, the effect of fuel rail leakage may be accommodated by adjusting the measured rail pressures before using the measured values to evaluate the correctness of the pump installation. FIG. 5 depicts a method element (block 140) that may be used to adjust measured rail pressures from block 124 using rail pressure drops corresponding to fuel rail system leakage values, before evaluation (block 130). As mentioned above, corresponding pressure drop versus time relationships for measured leakage rates of the specific fuel rail system could be used.

The method also may include the further step of determining from the measured rail pressures (or adjusted rail pressures) whether the selected pumping event occurred at a desired crank angle, or within a desired crank angle range (block 130). In the FIG. 3 example, the measured rail pressures $RP_1$ and $RP_2$ could be compared with respective predetermined pressure values $P_1$ and $P_2$ for the same crank angle measuring times, for correct pump installation. That is, the earlier pressure measurement $RP_1$ could be required to be less than or equal to a first predetermined value $P_1$, and the later pressure measurement $RP_2$ could be required to be less greater or equal to a second predetermined value $P_2$. The advantage of the double test is that failure to meet one or the other condition may be used not only to indicate incorrect installation, but also to guide the operator on the direction to change pump timing (i.e. either advancing or retarding pump gear relative to the engine gear). See curves b and c of FIG. 3. However, in some embodiments, the difference between the two rail pressure measurements can be compared to a predetermined difference value, where a measured difference value greater than or equal to the predetermined difference value would indicate correct installation.

Also, if testing with different pump valve timing angle settings is being carried out, the evaluation would use the pressure rises, (e.g., $RPR_1$ and $RPR_2$, calculated from the sets of rail pressures obtained at the two or more different valve timing angle settings. In this case, the evaluation also may use predetermined rail pressure rise values, e.g. $PR_1$ and $PR_2$, as explained previously.

FIG. 5 depicts further aspects of the methods of the present disclosure, such as when the fuel rail pressures resulting from performance of the method elements of blocks 112-130 are found (in block 142) not to be consistent with the expected fuel rail pressures (or rail pressure rises) for a correctly installed pump. Depending upon a particular application (single pump element versus multiple element pump) logic steps in blocks 132 and 134 may allow further testing to confirm incorrect installation before engine shutdown, re-indexing the pump gear, and testing with a different timing angle (block 134). Specifically, as depicted by block 136, the test sequence in blocks 114-124 may be rerun using a different pump element, to rule out the possibility that the less than satisfactory measured fuel rail pressures were due to a faulty pump element, and not an incorrectly installed pump gear. If the result of tests using another pump element, which is driven and thus timed by the same pump gear, prove to be satisfactory, then it may be concluded that the installation is correct but that the first fuel pumping element is faulty.

The logic in blocks 132 and 134 may further provide, in the case where all pump elements are tested, or for an application having only a single pump element, and where unsatisfactory pressure measurements were obtained, that the method sequence in FIG. 5 may provide that the engine is shut down and the pump gear reinstalled at a different timing angle or, if applicable, an angle offset be provided to trim the SOC pump timing angle values stored in the ECM. (block 138). Thereafter, the method elements in blocks 112-130 may be repeated one or more times until testing indicates correct pump gear installation (or adequate trim control) at block 142. The change in timing angle may be achieved by indexing the pump gear one or more gear teeth relative to the engine timing gear either to retard the pumping events relative to engine timing i.e. the pumping event would occur at a later crank angle, or to advance the pumping event, where the pumping event would occur at an earlier crank angle.

It will be apparent to those skilled in the art that various modifications and variations can be made to the disclosed gear-driven fuel pump installation testing apparatus and methods. Other embodiments will be apparent to those skilled in the art from consideration of the specification and practice of the disclosed apparatus and methods. It is intended that the specification and examples be considered as exemplary only, with the true scope being indicated by the following claims and their equivalence.

What is claimed is:

1. A method for detecting whether a gear-driven fuel pump has been installed correctly in a fuel injected IC engine, the pump being driven by an engine gear to feed injectors via a fuel rail, the method comprising:

(a) providing a pump element pumping event;

(b) disabling overlapping fuel injectors during a test period surrounding the pumping event;

(c) measuring the pressure in the rail at at least two different engine crank angles during the test period with the overlapping injectors disabled, the two crank angles surrounding the pumping event; and (d) determining from the measured rail pressures whether the pumping event occurred at a desired engine crank angle.

2. The method as in claim 1, wherein the determining element includes determining whether an earlier of the two measured rail pressures is equal to or less than a first predetermined pressure and a later of the two measured rail pressures is equal to or greater than a second predetermined pressure.

3. The method as in claim 1, wherein the pump is a multi-element pump, and wherein the disabling step includes disabling overlapping pumping events from other pump elements during the test period.

4. The method as in claim 1, wherein the measured rail pressures are adjusted to account for pressure drops due to fuel rail leakage.

5. The method as in claim 1, wherein the pump element is a first pump element of a multi-element pump, and wherein the method further comprises repeating at least method elements (a)-(c) for at least one other pump element.

6. The method as in claim 1, wherein rail pressure is controlled by an engine ECM, the method further comprising overriding the rail pressure control feature of the ECM.

7. The method as in claim 1, wherein the engine includes a pump valve for controlling fuel delivery to the rail and having a variable opening timing angle, and wherein the two rail pressure measurement are taken at each of two or more pumping events at different pump valve timing angles.

8. The method as in claim 7, wherein the pump valve is controlled by a current-activated solenoid, wherein the pump valve timing angle is varied by varying the crank angle of the start of the current (SOC) supplied to the solenoid.

9. The method as in claim 7 wherein the determining element includes determining whether a measured rail pressure rise calculated from the measured rail pressures at the earlier of the first and second pump valve timing angles is less than or equal to a first predetermined value and whether a rail pressure rise calculated from the rail measured rail pressures at the later of the first and second pump valve timing angles is greater than or equal to a second predetermined value.

10. The method as in claim 8, wherein the engine includes an ECM with stored SOC angles, and wherein the method includes adjusting the stored SOC angles in the ECM by an offset angle when the gear-driven fuel pump has been found to have been installed incorrectly.

11. A method for detecting whether a gear-driven fuel pump has been installed correctly in a fuel injected IC engine, the pump being driven by an engine gear to feed injectors via a fuel rail, and the engine including a pump valve having a variable opening timing angle for controlling fuel delivery to the rail, the method comprising:

(a) setting the pump valve timing at a first timing angle;

(b) providing a pump element pumping event;

(c) disabling overlapping fuel injectors and overlapping pumping events during a test period surrounding the pumping event;

(d) measuring the pressure in the rail at at least two different engine crank angles surrounding the pumping event during the test period with the overlapping injectors disabled and calculating a first rail pressure rise value;

(e) setting the pump valve timing at a second timing angle;

(f) repeating elements (b)-(d) to obtain a second pressure rise value; and (g) determining from the first and second measured rail pressure rise values whether the pumping event occurred at a desired engine crank angle, wherein the determining step includes determining whether the pressure rise value corresponding to an earlier of the first and second pump timing angles is equal to or less than a first predetermined value and the pressure rise value corresponding to the later of the two measured rail pressure rises is equal to or greater than a second predetermined value.

12. Apparatus for detecting whether a gear-driven fuel pump has been installed correctly in a fuel injected IC engine, the pump being driven by an engine gear to feed injectors via a fuel rail, the fuel delivery to the rail being controlled by a variable timing angle pump valve the apparatus comprising:

a programmed computer operatively connectable to the engine and having (a) software for providing a pump element pumping event (b) software for disabling overlapping injectors during a test period surrounding the pumping event;

(c) software for measuring the pressure in the rail at at least two engine crank angles surrounding the pumping event during the test period with the overlapping injectors disabled, the computer also having software for controlling operation of the providing software, disabling software, and the measuring software; and (d) software for determining from the measured rail pressures whether the pumping event occurred at a desired engine crank angle, and wherein the controlling software also controls the determining software.

13. The apparatus as in claim 12, wherein the programmed computer also includes software to determine whether an earlier of the two measured rail pressures is equal to or less than a first predetermined pressure and a later of the two measured rail pressures is equal to or greater than a second predetermined pressure.

14. The apparatus as in claim 12, wherein the programmed computer is selected from a stand-alone test unit and an engine electronic control module (ECM) computer.

15. The apparatus as in claim 12, wherein the engine includes an ECM that controls rail pressure during normal operation, and wherein the programmed computer further includes software to override the ECM rail pressure control.

16. The apparatus as in claim 12, wherein the engine includes an ECM, wherein the programmed computer is a stand-alone computer, and wherein the apparatus further includes a service tool for interconnecting the programmed computer and the ECM.

17. The apparatus as in claim 12, wherein the engine includes a variable opening timing angle pump valve for controlling fuel delivery to the rail, and wherein the programmed computer further includes software for setting the pump valve timing at a first angle prior to the pumping event to provide a first set of measured rail pressures, and then resetting the pump valve timing at a second angle to provide a second set of measured rail pressures.

18. The apparatus as in claim 17, wherein the programmed computer also includes software for calculating respective first and second rail pressure rise values from the first and second sets of measured rail pressures, and for determining from the first and second rail pressure rise values whether the pumping events occurred at a desired engine crank angle.

19. The apparatus as in claim 18, wherein the determining software determines whether the pump pressure rise value corresponding to the earlier of the first and second timing angles is less than or equal to a first predetermined value, and whether the pump pressure rise value corresponding to the later of the first and second timing angles is greater than or equal to a second predetermined value.

* * * * *